United States Patent
Park et al.

(10) Patent No.: US 9,816,833 B2
(45) Date of Patent: Nov. 14, 2017

(54) METHOD AND APPARATUS FOR PROVIDING LOCATION BASED SERVICE

(71) Applicant: Samsung Electronics Co., Ltd., Gyeonggi-do (KR)

(72) Inventors: Jihyun Park, Gyeonggi-do (KR); Soohyung Kim, Gyeonggi-do (KR); Soonhyun Cha, Gyeonggi-do (KR); Hyunsoo Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 14/529,071

(22) Filed: Oct. 30, 2014

(65) Prior Publication Data

US 2015/0120180 A1    Apr. 30, 2015

(30) Foreign Application Priority Data

Oct. 30, 2013  (KR) .................. 10-2013-0130005

(51) Int. Cl.
*G01C 21/00*    (2006.01)
*G01C 21/36*    (2006.01)

(52) U.S. Cl.
CPC ................. *G01C 21/3682* (2013.01)

(58) Field of Classification Search
None
See application file for complete search history.

(56) References Cited

U.S. PATENT DOCUMENTS

| 7,096,030 | B2 | 8/2006 | Huomo | |
| 2006/0112428 | A1* | 5/2006 | Etelapera | G11C 7/24 726/16 |
| 2008/0208447 | A1* | 8/2008 | Geelen | G01C 21/34 701/533 |
| 2013/0103306 | A1* | 4/2013 | Uetake | G01C 21/3605 701/425 |
| 2013/0237204 | A1* | 9/2013 | Buck | H04M 1/72569 455/418 |

FOREIGN PATENT DOCUMENTS

| JP | 2011-003151 | 1/2011 |
| KR | 10-0978049 | 8/2010 |
| KR | 10-2012-0087266 | 8/2012 |

* cited by examiner

*Primary Examiner* — James M McPherson

(57) ABSTRACT

An electronic device offers acquired location information to a point-of-interest (POI) management server when a predetermined condition is satisfied. The POI management server offers POI identification information to the electronic device when the location information is matched to one of registered POIs. When the POI identification information is received from the POI management server, the electronic device performs a certain action.

20 Claims, 10 Drawing Sheets

METHOD AND APPARATUS FOR PROVIDING LOCATION BASED SERVICE

CROSS-REFERENCE TO RELATED APPLICATION(S) AND CLAIM OF PRIORITY

The present application is related to and claims the benefit under 35 U.S.C. §119(a) of a Korean patent application filed on Oct. 30, 2013 in the Korean Intellectual Property Office and assigned Serial No. 10-2013-0130005, the entire disclosure of which is hereby incorporated by reference.

TECHNICAL FIELD

The present disclosure relates to a method and an apparatus for providing a location based service.

BACKGROUND

With a remarkable growth of technologies, recent mobile electronic devices have had stronger computing power. Additionally, these electronic devices are gradually evolving into advanced forms capable of supporting much more functions through a variety of sensors as well as of performing much more complicated and various operations.

Nowadays such a mobile electronic device not only can use applications basically offered by its manufacturer, but also can use other applications produced by any other manufacturer or user-created applications.

A location based service (LBS) is one of recently emerging applications. In these days, various location based services are widely used in many fields such as navigation, location tracking, and the like.

Normally location based services require a location determination technique using, for example, GPS (Global Positioning System), a cell-ID in a cellular network, or an identifier in a Wi-Fi network.

These traditional techniques for determining a location in location based services simply depend on a public infrastructure. Therefore, a typical location based service encounters difficulty in effectively providing a service in connection with the use of applications, and also fails to satisfy an attempt to specify and utilize private location information or a movable point-of-interest (POI).

SUMMARY

To address the above-discussed deficiencies, it is a primary object to provide a method and system for specifying private location information or a movable point-of-interest (POI) in providing a location based service for an electronic device.

According to an embodiment of this disclosure, a method for providing a location based service for an electronic device is provided. This method comprises, at the electronic device, offering acquired location information to a point-of-interest (POI) management server when a predetermined condition is satisfied; at the POI management server, offering POI identification information to the electronic device when the location information is matched to one of registered POIs; and at the electronic device, performing a specific matching action when the POI identification information is received from the POI management server.

According to an embodiment of this disclosure, a system for providing a location based service for an electronic device. This system comprises the electronic device and a point-of-interest (POI) management server. The electronic device includes a communication module configured to acquire location information and to communicate with the POI management server; a memory configured to store therein information on a registered POI, and a processor configured to offer the acquired location information to the POI management server through the communication module when a predetermined condition is satisfied, and to perform a specific matching action when POI identification information is received from the POI management server. The POI management server includes a network communication unit configured to communicate with the electronic device; a POI database configured to configured to store therein the registered POI information; and a server control unit configured to determine whether the location information received from the electronic device through the network communication unit is matched to the registered POI information stored in the POI database, and to offer POI identification information to the electronic device through the network communication unit when the received location information is matched to the registered POI information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
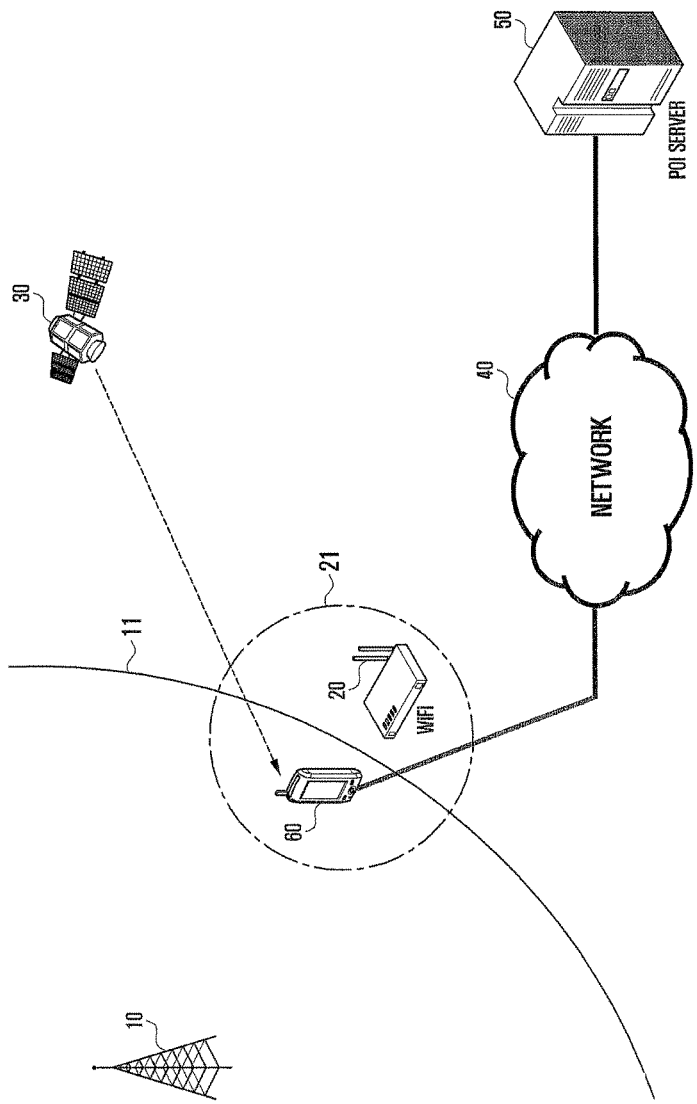
FIG. 1 is a schematic view of a location based service provided in various ways at an electronic device according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure can be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a schematic view of a location based service provided in various ways at an electronic device according to an embodiment of the present disclosure.

Referring to FIG. 1, there are an electronic device 60 for providing a location based service (LBS) to a user, a base station 10 for providing location information to the electronic device 60 in a mobile communication network, a satellite 30 for providing a signal used for acquiring location information to the electronic device 60, and an access point 20 which is one of wireless communication devices for offering location information to the electronic device 60. Additionally, the electronic device 60 can communicate, through a suitable network 40, with a point-of-interest (POI) management server 50 that manages POIs.

The electronic device 60 can be designed to be easily carried or moved, also being capable of wireless communication. The electronic device 60 can perform a voice, video, and/or data communication through the base station 10 in a mobile communication network such as 2G, 3G, LTE™ (Long Term Evolution), LTE-A™ (LTE-Advanced), or the like. To support LBS of this disclosure, the base station 10 can offer location information thereof to the electronic device 60. Location information provided by the base station can be, for example, cell identification (Cell ID), base station identification, sector identification of a base station, or the like. Using such location information provided by the base station 10, the electronic device 60 can offer LBS to users.

Additionally, the electronic device 60 can transmit or receive data, using any wireless communication technique, e.g., Wi-Fi™, other than a mobile communication network. Namely, the electronic device 60 can perform a wireless communication with the access point 20 based on Wi-Fi technique and receive location information from the access point 20. Then, based on the received location information, the electronic device 60 can offer LBS to users.

Additionally, the electronic device 60 can calculate the location thereof, using signals received from the satellite 30. Although a single satellite is shown in the drawing, three or more satellites can be used actually. Using calculation results of the location, the electronic device 60 can offer LBS to users.

Additionally, the electronic device 60 can provide autonomously LBS and communicate with the POI management server 50 through the network 40. Based on signals or data received from the electronic device 60, the POI management server 50 can perform the registration of POI and also determine whether the electronic device enters the registered POI.

The POI management server 50 can be a private server (such as a private cloud), a specific operator's server, or a public network server. The POI management server 50 can store POI information corresponding to the electronic device 60 in the database thereof when a request for registering POI is received from the electronic device 60. Further, based on location information received periodically or intermittently from the electronic device 60, the POI management server 50 can determine whether the electronic device 60 enters one of the registered POIs. If so, the POI management server 50 can notify the entry into POI to the electronic device 60 through the network 40. When such notification signals or data are received, the electronic device 60 can perform a necessary or predetermined operation, e.g., offer a notification or popup message or perform the access to internet. Related details will be given below.

Figure 2:
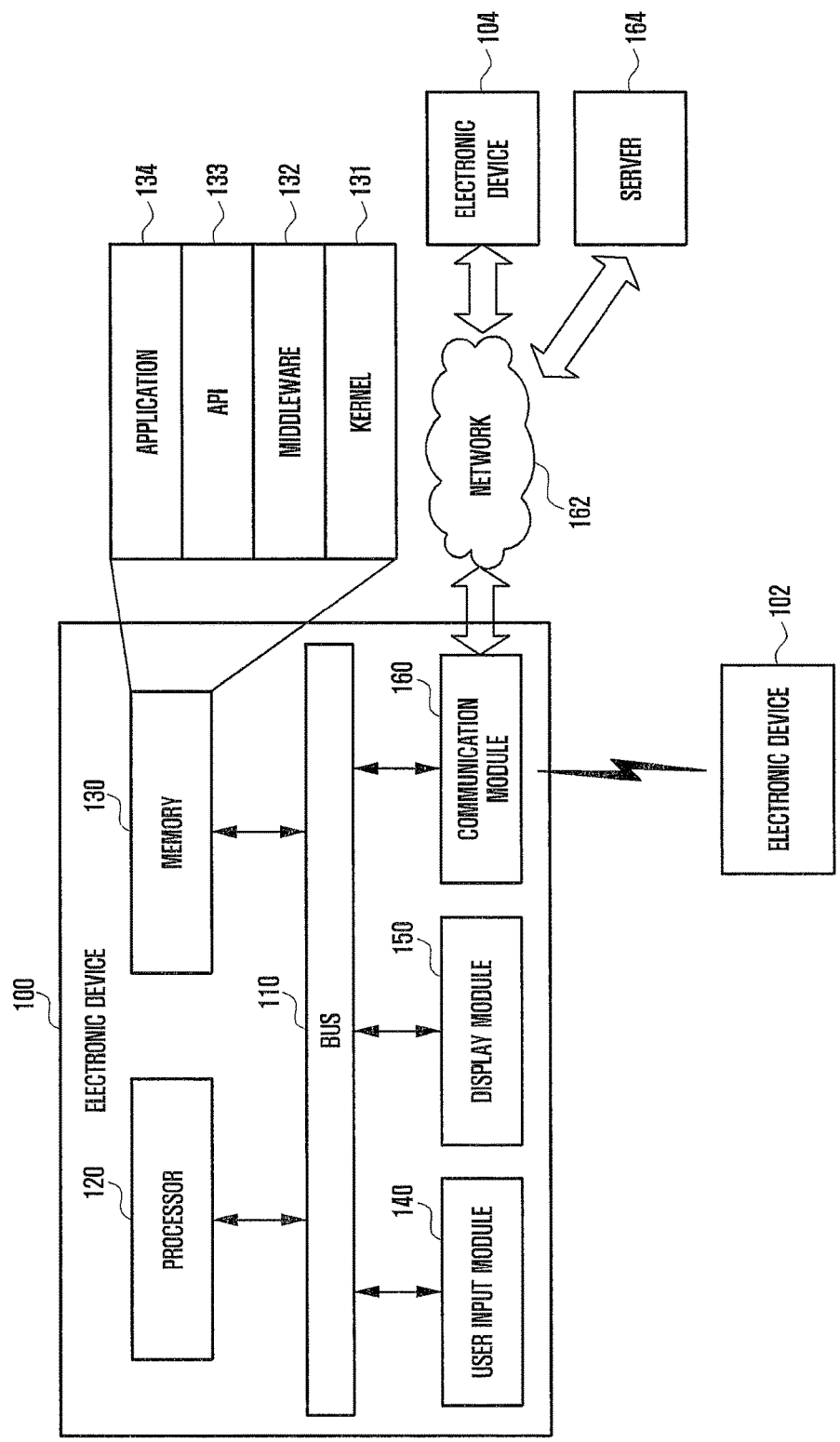
FIG. 2 illustrating a block diagram of an electronic device according to an embodiment of the present disclosure.

FIG. 2 is a block diagram illustrating a configuration of an electronic device according to an embodiment of the present disclosure.

Referring to FIG. 2, the electronic device 100 can include a bus 110, a processor 120, a memory 130, a user input module 140, a display module 150, a communication module 160, and other similar and/or suitable components.

The bus 110 can be a circuit which interconnects the above-described elements and delivers a communication (e.g., a control message) between the above-described elements.

The processor 120 can receive commands from the above-described other elements (e.g., the memory 130, the user input module 140, the display module 150, the communication module 160, etc.) through the bus 110, can interpret the received commands, and can execute calculation or data processing according to the interpreted commands.

The memory 130 can store commands or data received from the processor 120 or other elements (e.g., the user input module 140, the display module 150, the communication module 160, etc.) or generated by the processor 120 or the other elements. The memory 130 can include programming modules, such as a kernel 131, middleware 132, an Application Programming Interface (API) 133, an application 134, and the like. Each of the above-described programming modules can be implemented in software, firmware, hardware, or a combination of two or more thereof.

The kernel 131 can control or manage system resources (e.g., the bus 110, the processor 120, the memory 130, etc.) used to execute operations or functions implemented by other programming modules (e.g., the middleware 132, the API 133, and the application 134). Also, the kernel 131 can provide an interface capable of accessing and controlling or managing the individual elements of the electronic device 100 by using the middleware 132, the API 133, or the application 134.

The middleware 132 can serve to go between the API 133 or the application 134 and the kernel 131 in such a manner that the API 133 or the application 134 communicates with the kernel 131 and exchanges data therewith. Also, in relation to work requests received from one or more applications 134 and/or the middleware 132, for example, can perform load balancing of the work requests by using a method of assigning a priority, in which system resources (e.g., the bus 110, the processor 120, the memory 130, etc.) of the electronic device 100 can be used, to at least one of the one or more applications 134.

The API 133 is an interface through which the application 134 is capable of controlling a function provided by the kernel 131 or the middleware 132, and can include, for example, at least one interface or function for file control, window control, image processing, character control, or the like.

The user input module 140, for example, can receive a command or data as input from a user, and can deliver the received command or data to the processor 120 or the memory 130 through the bus 110. The display module 150 can display a video, an image, data, or the like to the user.

The communication module 160 can connect communication between another electronic device 102 and the electronic device 100. The communication module 160 can support a predetermined short-range communication protocol (e.g., Wi-Fi™, BlueTooth™ (BT), and Near Field Communication™ (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 can be a device which is identical (e.g., of an identical type) to or different (e.g., of a different type) from the electronic device 100. Further, the communication module 160 can connect communication between a server 164 and the electronic device 100 via the network 162.

Figure 3:
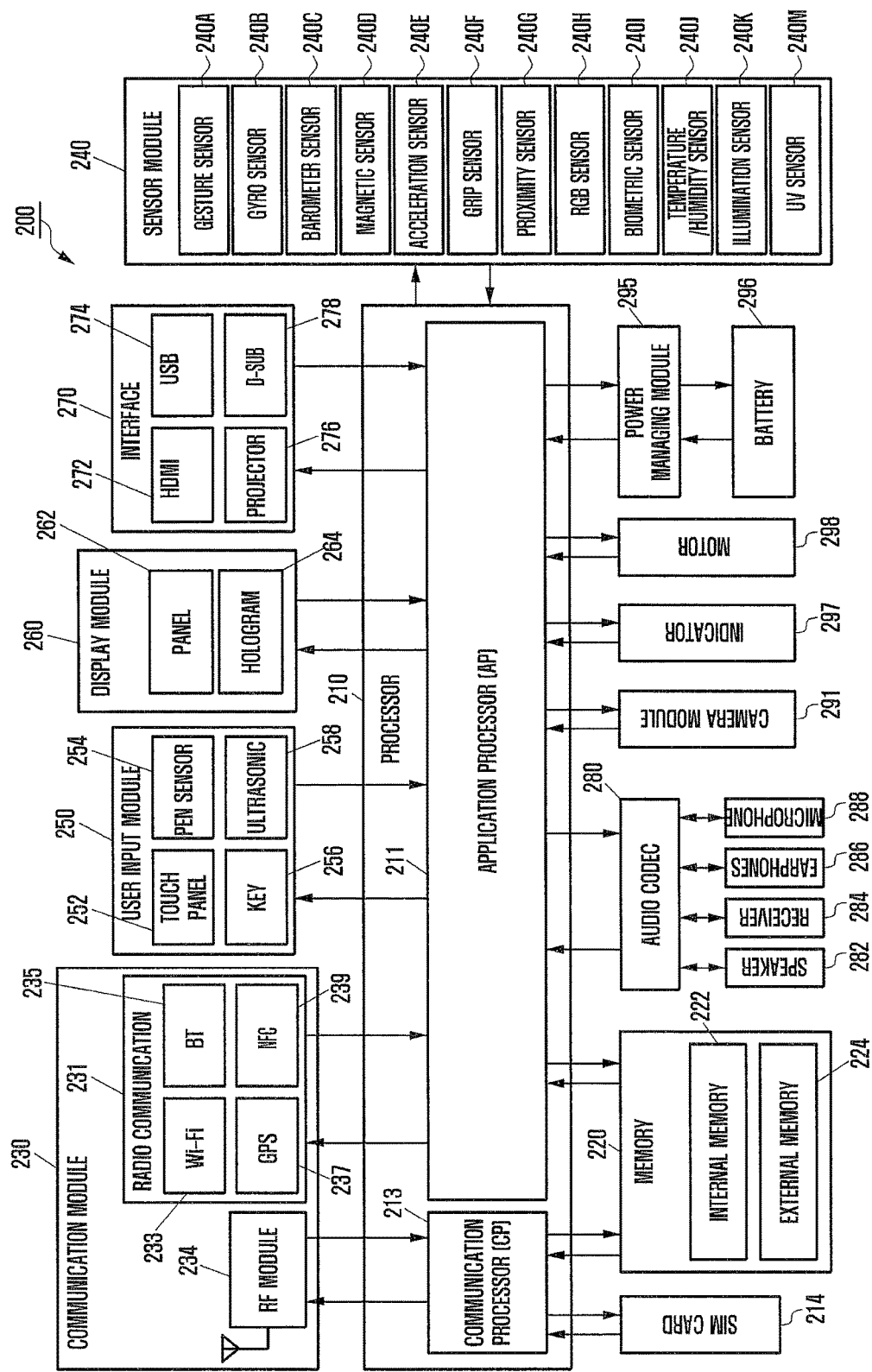
FIG. 3 illustrates a block diagram of an electronic device according to an embodiment of the present disclosure.

FIG. 3 is a block diagram illustrating a configuration of hardware 200 according to an embodiment of the present disclosure.

The hardware 200 can be, for example, the electronic device 100 illustrated in FIG. 2.

Referring to FIG. 3, the hardware 200 can include one or more processors 210, a Subscriber Identification Module (SIM) card 214, a memory 220, a communication module 230, a sensor module 240, a user input module 250, a display module 260, an interface 270, an audio coder/decoder (codec) 280, a camera module 291, a power management module 295, a battery 296, an indicator 297, a motor 298 and any other similar and/or suitable components.

The processor 210 (e.g., the processor 120) can include one or more Application Processors (APs) 211, or one or more Communication Processors (CPs) 213. The processor 210 can be, for example, the processor 120 illustrated in FIG. 2. The AP 211 and the CP 213 are illustrated as being included in the processor 210 in FIG. 3, but can be included in different Integrated Circuit (IC) packages, respectively. According to an embodiment of the present disclosure, the AP 211 and the CP 213 can be included in one IC package.

The AP 211 can execute an Operating System (OS) or an application program, and thereby can control multiple hardware or software elements connected to the AP 211 and can perform processing of and arithmetic operations on various data including multimedia data. The AP 211 can be implemented by, for example, a System on Chip (SoC). According to an embodiment of the present disclosure, the processor 210 can further include a Graphical Processing Unit (GPU) (not illustrated).

The CP 213 can manage a data line and can convert a communication protocol in the case of communication between the electronic device (e.g., the electronic device 100) including the hardware 200 and different electronic devices connected to the electronic device through the network. The CP 213 can be implemented by, for example, a SoC. According to an embodiment of the present disclosure, the CP 213 can perform at least some of multimedia control functions. The CP 213, for example, can distinguish and authenticate a terminal in a communication network by using a subscriber identification module (e.g., the SIM card 214). Also, the CP 213 can provide the user with services, such as a voice telephony call, a video telephony call, a text message, packet data, and the like.

Further, the CP 213 can control the transmission and reception of data by the communication module 230. In FIG. 3, the elements such as the CP 213, the power management module 295, the memory 220, and the like are illustrated as elements separate from the AP 211. However, according to an embodiment of the present disclosure, the AP 211 can include at least some (e.g., the CP 213) of the above-described elements.

According to an embodiment of the present disclosure, the AP 211 or the CP 213 can load, to a volatile memory, a command or data received from at least one of a non-volatile memory and other elements connected to each of the AP 211 and the CP 213, and can process the loaded command or data. Also, the AP 211 or the CP 213 can store, in a non-volatile memory, data received from or generated by at least one of the other elements.

The SIM card 214 can be a card implementing a subscriber identification module, and can be inserted into a slot formed in a particular portion of the electronic device 100. The SIM card 214 can include unique identification information (e.g., Integrated Circuit Card IDentifier (ICCID)) or subscriber information (e.g., International Mobile Subscriber Identity (IMSI)).

The memory 220 can include an internal memory 222 and an external memory 224. The memory 220 can be, for example, the memory 130 illustrated in FIG. 2. The internal memory 222 can include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 222 can be in the form of a Solid State Drive (SSD). The external memory 224 can further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module (e.g., a transceiver) 230 can include a wireless communication module 231 or a Radio Frequency (RF) module 234. The communication module 230 can be, for example, the communication module 160 illustrated in FIG. 2. The wireless communication module 231 can include, for example, a Wi-Fi part 233, a BT part 235, a GPS part 237, or a NFC part 239. For example, the wireless communication module 231 can provide a wireless communication function by using a radio frequency. Additionally or alternatively, the wireless communication module 231 can include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 234 can be used for transmission and reception of data, for example, transmission and reception of RF signals or called electronic signals. Although not illustrated, the RF unit 234 can include, for example, a transceiver, a Power Amplifier Module (PAM), a frequency filter, a Low Noise Amplifier (LNA), or the like. Also, the RF module 234 can further include a component for transmitting and receiving electromagnetic waves in a free space in a wireless communication, for example, a conductor, a conductive wire, or the like.

The sensor module 240 can include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 can measure a physical quantity or can sense an operating state of the electronic device 100, and can convert the measured or sensed information to an electrical signal. Additionally/alternatively, the sensor module 240 can include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 can include, for example, an E-nose sensor (not illustrated), an EMG sensor (not illustrated), an EEG sensor (not illustrated), an ECG sensor (not illustrated), a fingerprint sensor, and the like. The sensor module 240 can further include a control circuit (not illustrated) for controlling one or more sensors included therein.

The user input module 250 can include a touch panel 252, a pen sensor 254 (e.g., a digital pen sensor), keys 256, and an ultrasonic input unit 258. The user input module 250 can be, for example, the user input module 140 illustrated in FIG. 2. The touch panel 252 can recognize a touch input in at least one of, for example, a capacitive scheme, a resistive scheme, an infrared scheme, and an acoustic wave scheme. Also, the touch panel 252 can further include a controller (not illustrated). In the capacitive type, the touch panel 252 is capable of recognizing proximity as well as a direct touch. The touch panel 252 can further include a tactile layer (not illustrated). In this event, the touch panel 252 can provide a tactile response to the user.

The pen sensor 254 (e.g., a digital pen sensor), for example, can be implemented by using a method identical or similar to a method of receiving a touch input from the user, or by using a separate sheet for recognition. For example, a key pad or a touch key can be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 can receive a user input from an external device (e.g., a network, a computer, or a server), which is connected to the communication module 230, through the communication module 230.

The display module 260 can include a panel 262 or a hologram 264. The display module 260 can be, for example, the display module 150 illustrated in FIG. 2. The panel 262 can be, for example, a Liquid Crystal Display (LCD) and an Active Matrix Organic Light Emitting Diode (AM-OLED) display, and the like. The panel 262 can be implemented so as to be, for example, flexible, transparent, or wearable. The panel 262 can include the touch panel 252 and one module. The hologram 264 can display a three-dimensional image in the air by using interference of light. According to an embodiment of the present disclosure, the display module 260 can further include a control circuit for controlling the panel 262 or the hologram 264.

The interface 270 can include, for example, a High-Definition Multimedia Interface (HDMI) 272, a Universal Serial Bus (USB) 274, a projector 276, and a D-subminiature (D-sub) 278. Additionally or alternatively, the interface 270 can include, for example, SD/Multi-Media Card (MMC) (not illustrated) or Infrared Data Association (IrDA) (not illustrated).

The audio codec 280 can bidirectionally convert between a voice and an electrical signal. The audio codec 280 can convert voice information, which is input to or output from the audio codec 280 through, for example, a speaker 282, a receiver 284, an earphone 286, the microphone 288 or the like.

The camera module 291 can capture an image and a moving image. According to an embodiment, the camera module 291 can include one or more image sensors (e.g., a front lens or a back lens), an Image Signal Processor (ISP) (not illustrated), and a flash LED (not illustrated).

The power management module 295 can manage power of the hardware 200. Although not illustrated, the power management module 295 can include, for example, a Power Management Integrated Circuit (PMIC), a charger Integrated Circuit (IC), or a battery fuel gauge.

The PMIC can be mounted to, for example, an IC or a SoC semiconductor. Charging methods can be classified into a wired charging method and a wireless charging method. The charger IC can charge a battery, and can prevent an overvoltage or an overcurrent from a charger to the battery. According to an embodiment of the present disclosure, the charger IC can include a charger IC for at least one of the wired charging method and the wireless charging method. Examples of the wireless charging method can include a magnetic resonance method, a magnetic induction method, an electromagnetic method, and the like. Additional circuits (e.g., a coil loop, a resonance circuit, a rectifier, etc.) for wireless charging can be added in order to perform the wireless charging.

The battery fuel gauge can measure, for example, a residual quantity of the battery 296, or a voltage, a current or a temperature during the charging. The battery 296 can supply power by generating electricity, and can be, for example, a rechargeable battery.

The indicator 297 can indicate particular states of the hardware 200 or a part (e.g., the AP 211) of the hardware 200, for example, a booting state, a message state, a charging state and the like. The motor 298 can convert an electrical signal into a mechanical vibration. The processor 210 can control the sensor module 240.

Although not illustrated, the hardware 200 can include a processing unit (e.g., a GPU) for supporting a module TV. The processing unit for supporting a module TV can process media data according to standards such as, for example, Digital Multimedia Broadcasting (DMB), Digital Video Broadcasting (DVB), media flow, and the like. Each of the above-described elements of the hardware 200 according to an embodiment of the present disclosure can include one or more components, and the name of the relevant element can change depending on the type of electronic device. The hardware 200 according to an embodiment of the present disclosure can include at least one of the above-described elements. Some of the above-described elements can be omitted from the hardware 200, or the hardware 200 can further include additional elements. Also, some of the elements of the hardware 200 according to an embodiment of the present disclosure can be combined into one entity, which can perform functions identical to those of the relevant elements before the combination.

The term "module" used in the present disclosure can refer to, for example, a unit including one or more combinations of hardware, software, and firmware. The "module" can be interchangeable with a term, such as "unit," "logic," "logical block," "component," "circuit," or the like. The "module" can be a minimum unit of a component formed as one body or a part thereof. The "module" can be a minimum unit for performing one or more functions or a part thereof. The "module" can be implemented mechanically or electronically. For example, the "module" according to an embodiment of the present disclosure can include at least one of an Application-Specific Integrated Circuit (ASIC) chip, a Field-Programmable Gate Array (FPGA), and a programmable-logic device for performing certain operations which have been known or are to be developed in the future.

Figure 4:
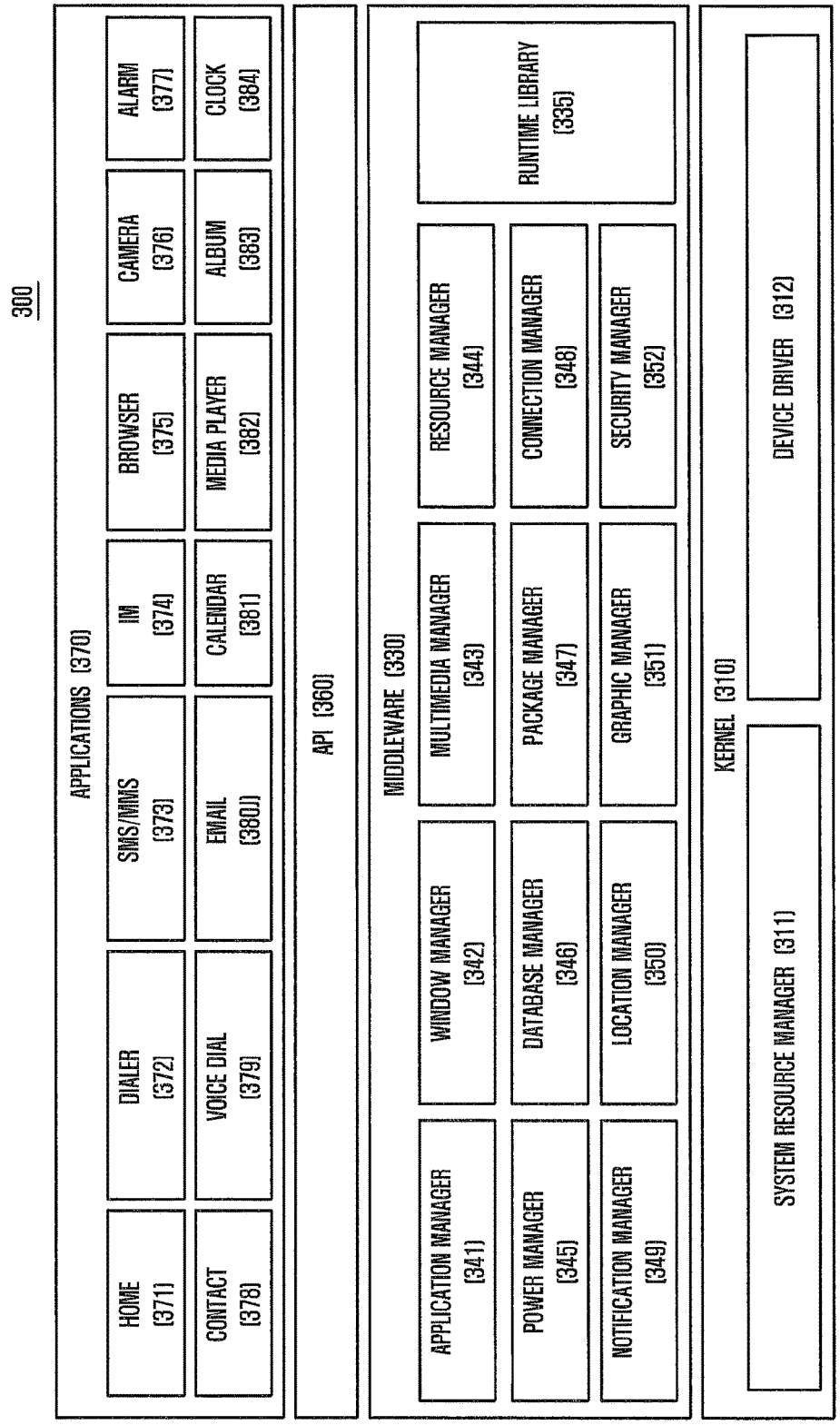
FIG. 4 illustrates a block diagram of a programming module installable in an electronic device according to an embodiment of the present disclosure.

FIG. 4 is a block diagram illustrating a configuration of a programming module 300 according to an embodiment of the present disclosure.

The programming module 300 can be included (or stored) in the electronic device 100 (e.g., the memory 130) or can be included (or stored) in the electronic device 200 (e.g., the memory 230) illustrated in FIG. 3. At least a part of the programming module 300 can be implemented in software, firmware, hardware, or a combination of two or more thereof. The programming module 300 can be implemented in hardware (e.g., the hardware 200), and can include an OS controlling resources related to an electronic device (e.g., the electronic device 100) and/or various applications (e.g., an application 370) executed in the OS. For example, the OS can be Android™, iOS™, Windows™, Symbian™, Tizen™, Bada™, and the like.

Referring to FIG. 4, the programming module 300 can include a kernel 310, a middleware 330, an API 360, and/or the application 370.

The kernel 310 (e.g., the kernel 131) can include a system resource manager 311 and/or a device driver 312. The system resource manager 311 can include, for example, a process manager (not illustrated), a memory manager (not illustrated), and a file system manager (not illustrated). The system resource manager 311 can perform the control, allocation, recovery, and/or the like of system resources. The device driver 312 can include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 can include an Inter-Process Communication (IPC) driver (not illustrated).

The middleware 330 can include multiple modules previously implemented so as to provide a function used in common by the applications 370. Also, the middleware 330 can provide a function to the applications 370 through the API 360 in order to enable the applications 370 to efficiently use limited system resources within the electronic device. For example, as illustrated in FIG. 4, the middleware 330 (e.g., the middleware 132) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 can include, for example, a library module used by a complier, in order to add a new function by using a programming language during the execution of the application 370. According to an embodiment of the present disclosure, the runtime library 335 can perform functions which are related to input and output, the management of a memory, an arithmetic function, and/or the like.

The application manager 341 can manage, for example, a life cycle of at least one of the applications 370. The window manager 342 can manage GUI resources used on the screen. The multimedia manager 343 can detect a format used to reproduce various media files and can encode or decode a media file through a codec appropriate for the relevant format. The resource manager 344 can manage resources, such as a source code, a memory, a storage space, and/or the like of at least one of the applications 370.

The power manager 345 can operate together with a Basic Input/Output System (BIOS), can manage a battery or power, and can provide power information and the like used for an operation. The database manager 346 can manage a database in such a manner as to enable the generation, search and/or change of the database to be used by at least one of the applications 370. The package manager 347 can manage the installation and/or update of an application distributed in the form of a package file.

The connectivity manager 348 can manage a wireless connectivity such as, for example, Wi-Fi and Bluetooth. The notification manager 349 can display or report, to the user, an event such as an arrival message, an appointment, a proximity alarm, and the like in such a manner as not to disturb the user. The location manager 350 can manage location information of the electronic device. The graphic manager 351 can manage a graphic effect, which is to be provided to the user, and/or a user interface related to the graphic effect. The security manager 352 can provide various security functions used for system security, user authentication, and the like. According to an embodiment of the present disclosure, when the electronic device (e.g., the electronic device 100) has a telephone function, the middleware 330 can further include a telephony manager (not illustrated) for managing a voice telephony call function and/or a video telephony call function of the electronic device.

The middleware 330 can generate and use a new middleware module through various functional combinations of the above-described internal element modules. The middleware 330 can provide modules specialized according to types of OSs in order to provide differentiated functions. Also, the middleware 330 can dynamically delete some of the existing elements, or can add new elements. Accordingly, the middleware 330 can omit some of the elements described in the various embodiments of the present disclosure, can further include other elements, or can replace the some of the elements with elements, each of which performs a similar function and has a different name.

The API 360 (e.g., the API 133) is a set of API programming functions, and can be provided with a different configuration depending on OSs. In the case of Android™ or iOS™, for example, one API set can be provided to each platform. In the case of Tizen™, for example, two or more API sets can be provided to each platform.

The applications 370 (e.g., the applications 134) can include, for example, a preloaded application and/or a third party application. The applications 370 (e.g., the applications 134) can include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

A POI controller 385 of the application 370 can acquire location information of the electronic device 60 located in a specific zone and, based on the acquired location information, check whether the electronic device 60 enters any POI registered previously by the electronic device 60 or through the POI management server 50. The POI controller 385 can acquire the location information by using the sensor module 240 or communication module 230 of the electronic device 60 and set the acquired location as POI.

A method for setting POI by the POI controller 385 is as follows. A user can select, appoint, or input a desired POI through the user input module 250, or receive recommendation from other specific program in the electronic device 60 or the POI management server 50. In order to select, appoint, or input POI, a user can use various applications, containing location information therein, such as map, calendar, scheduler, camera, and weather, can use a user profile contained in SNS, mail, configuration, etc., or can directly input an address. For example, the POI controller 385 can select, as POI, a specific location appointed in a map application by a user, extract address information from a calendar application, a scheduler application, or a weather application, or select location information in such an application.

Additionally, the POI controller 385 can capture a surrounding image through the camera module 291, interpret a location from the captured image, and register the location as POI. To interpret a location, the POI controller 385 can use information stored in the memory 220, or transmit the captured image to a suitable server through the communication module 230. In the latter case, the POI controller 385 can acquire location information by receiving it from the server. Further, the POI controller 385 can acquire location information from a surrounding sound collected through the microphone 288. In this case as well, location information can be received from a suitable server.

Location information can be selected in some applications. For example, if a certain note "p.m. 4, Mar. 4, 2013, business meeting" is recorded in a calendar or scheduler application, there is much possibility that the location of this meeting is a frequently visiting place, and hence this place can be set as POI. Similarly, any address stored in a weather application can be set as POI.

In another embodiment, based on user context obtained through analysis of a log file in the electronic device 60, a frequently visiting place can be recommended as POI or automatically set as POI. For example, the electronic device 60 can analyze directly or through the POI management server 50 a user's moving history pattern within a certain period of time (e.g., one week or one month). Then, through a popup or toast window, the electronic device 60 can notify, to a user, location information about a specific place, for example, at which he or she stayed more than two hours or frequently visited more than five times per week, and inquire whether to set the location information as POI.

In still another embodiment, the location information about a place where a user stayed long for a given time or frequently invited can be automatically listed up as POI. Like this, setting, storing or managing POI can be performed by the electronic device 60 or through the POI management server 50.

At least a part of the programming module 300 can be implemented by instructions stored in a non-transitory computer-readable storage medium. When the instructions are executed by one or more processors (e.g., the one or more processors 210), the one or more processors can perform functions corresponding to the instructions. The non-transitory computer-readable storage medium can be, for example, the memory 220. At least a part of the programming module 300 can be implemented (e.g., executed) by, for example, the one or more processors 210. At least a part of the programming module 300 can include, for example, a module, a program, a routine, a set of instructions, and/or a process for performing one or more functions.

Names of the elements of the programming module (e.g., the programming module 300) according to an embodiment of the present disclosure can change depending on the type of OS. The programming module according to an embodiment of the present disclosure can include one or more of the above-described elements. Alternatively, some of the above-described elements can be omitted from the programming module. Alternatively, the programming module can further include additional elements. The operations performed by the programming module or other elements according to an embodiment of the present disclosure can be processed in a sequential method, a parallel method, a repetitive method, or a heuristic method. Also, some of the operations can be omitted, or other operations can be added to the operations.

Figure 5:
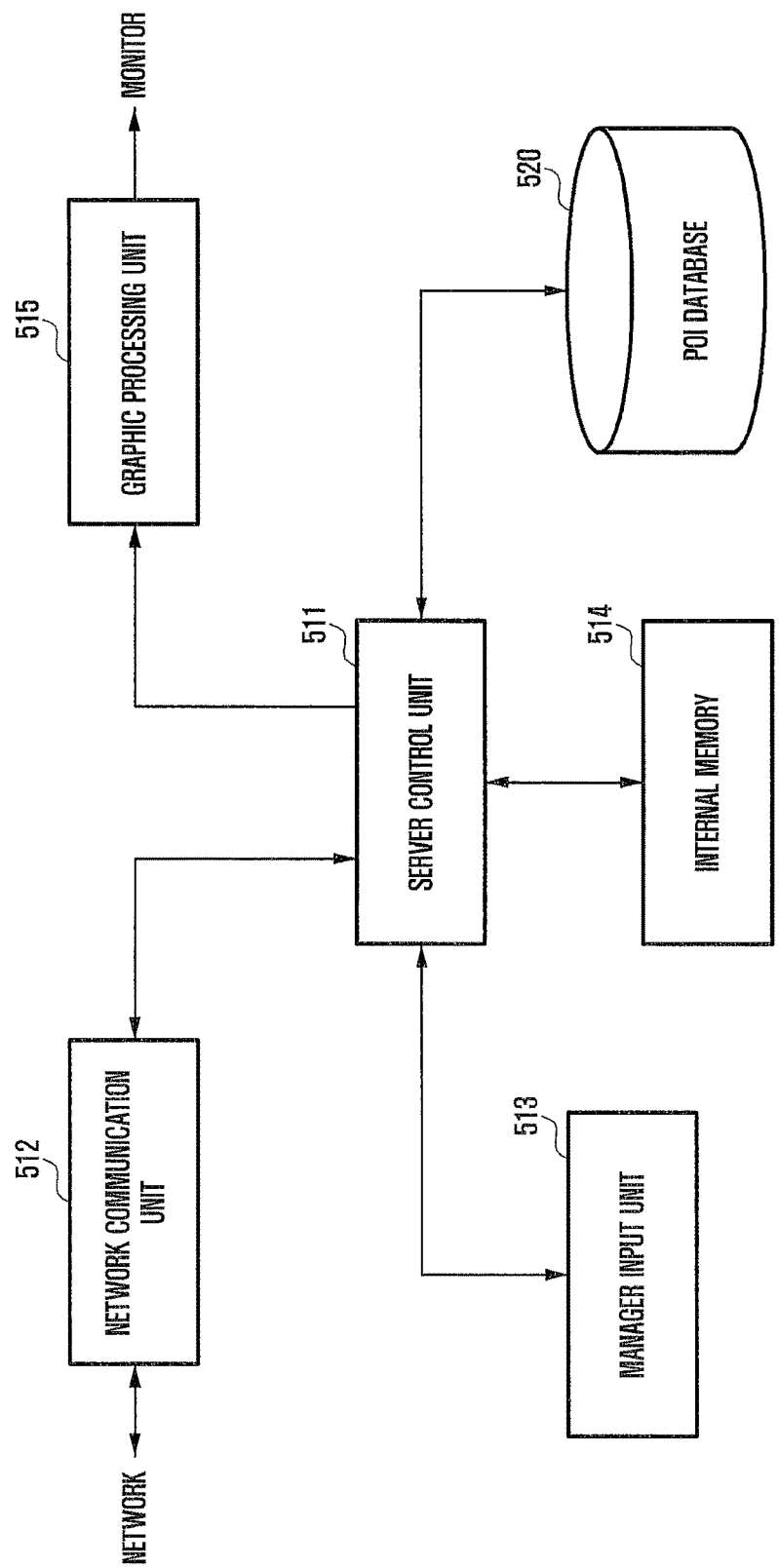
FIG. 5 illustrates a block diagram of a POI management server according to an embodiment of the present disclosure.

FIG. 5 is a block diagram illustrating a POI management server according to an embodiment of the present disclosure.

Referring to FIG. 5, the POI management server 50 can include a server control unit (controller) 511, a network communication unit (e.g., transceiver) 512, a manager input unit 513, an internal memory 514, a graphic processing unit (processor) 515, and a POI database 520.

The server control unit 511 can perform an overall control of the POI management server 50. For example, when any data about registration of POI is received from the electronic device 60, the server control unit 511 can control the POI database 520 to store therein the received data. Additionally, when any information about a specific zone to which the electronic device 60 is moved is received from the electronic device 60, the server control unit 511 can compare the received information with pre-stored information in the POI database 520 and then determine whether the electronic device 60 enters any registered POI. If so, the server control unit 511 can offer notification to the electronic device 60.

As mentioned above, the POI management server 50 can be a private server (such as a private cloud), a specific operator's server, or a public network server.

The network communication unit 512 transmits or receives data to or from the electronic device 60 through the network 40 shown in FIG. 1. For example, the network communication unit 512 can receive POI registration information or location information of the electronic device 60 from the electronic device 60. Also, when a certain electronic device enters a registered POI, the network communication unit 512 can transmit a related notification to the electronic device through the network 40 under the control of the server control unit 511.

The manager input unit 513 is an input device for a manager of the POI management server 50, including various forms of input devices such as a keyboard, a mouse, a touch pad, a joystick, and the like.

The internal memory 514 can be formed of a volatile memory. The internal memory 514 can store therein data required for the control of the server control unit 511 and temporarily store therein data to be stored in the POI database 520 or data read from the POI database 520. Also, the internal memory 514 can load or temporarily store therein data associated with an application triggered by a user.

The graphic processing unit 515 can offer an operating state of the POI management server 50 to a manager in various forms such as graphic, character, or symbol through a monitor (not shown).

The POI database 520 can store therein POIs linked to respective registered electronic devices and identifiers for identifying such POIs. Table 1 shows an example of the format of data stored in the POI database 520.

TABLE 1

| Identifier of Electronic Device | POI Code | Identifier | Remarks |
|---|---|---|---|
| User 1 | POI #01 | Cell ID_001<br>Photo_001<br>Sound_001<br>GPS Coordinate_001 | |
| | POI #02 | . . .<br>Cell ID_002<br>Photo_002<br>Sound_002<br>GPS Coordinate_002<br>. . . | |
| . . . | . . . | . . . | . . . |

As shown in Table 1, one electronic device (e.g., user 1) can be linked to various different POIs (e.g., POI #01, POI #02, etc.). Additionally, a single POI can have several identifiers. For example, for any place (i.e., location or point), different identifiers can be assigned to various types of information such as cell ID of a base station received from a mobile communication network, location information acquired from a satellite, information acquired from an access point in a Wi-Fi network, photo information about a specific place, sound information (including sounds having a high or low frequency as well as audible sounds) extracted from a specific place, and the like. Each of POIs can have only one identifier or have two or more identifiers. The POI database 520 can store therein different POIs for each electronic device.

Figure 6:
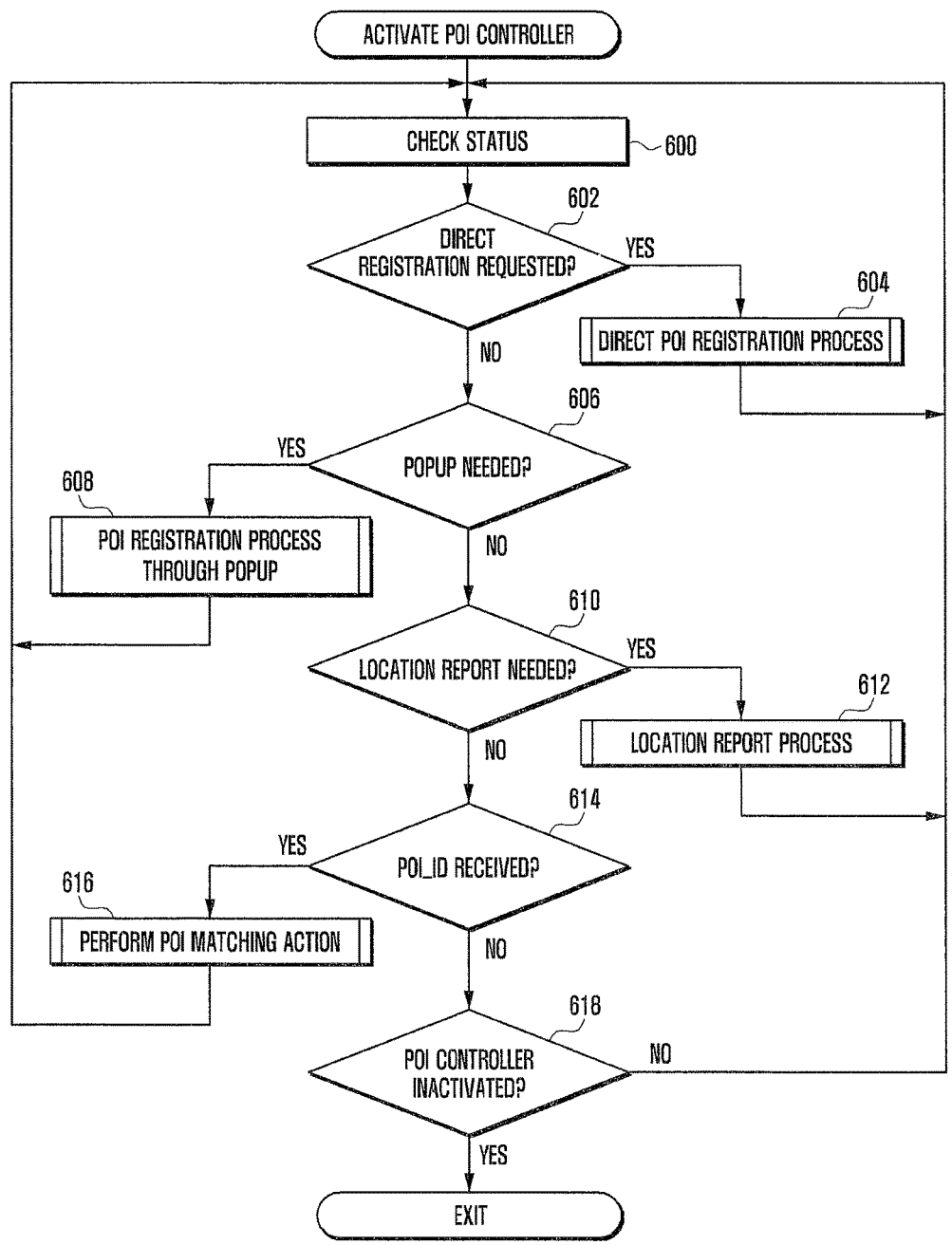
FIG. 6 illustrates a control operation of a POI controller in an electronic device according to an embodiment of the present disclosure.

FIG. 6 is a flow diagram illustrating a control process of a POI controller in an electronic device according to an embodiment of the present disclosure.

Hereinafter, FIG. 6 will be described basically using a configuration of the system shown in FIG. 1, and an internal structure of the electronic device will be described using configurations shown in FIGS. 2 and 3. Also, a flow shown in FIG. 6 can be made in a state where the POI controller 385 is activated.

At step 600, the processor 210 checks the status of the electronic device 60. Such a status check can include measuring the location of the electronic device 60, checking a staying time at a current location, and checking whether a POI identifier is received from the POI management server 50. While performing a status check, the processor 210 determines, at steps 602 through 618, whether particular operations are required.

At step 602, the processor 210 determines whether a request for registering POI is received directly from a user. This direct request of registration can be made through a key input, a touch input, a voice recognition, or any other input technique using the user input module 250. If there is a user's request for POI registration, the processor 210 proceeds to step 604. If there is no request, the processor proceeds to step 606. At step 604, the processor 210 performs a direct POI registration process. For example, the processor 210 can display map data and an input window on the display module 260 and then receive an address entered by a user through the input window. Also, the processor 210 can recognize a user's voice entered through the microphone 288 and the audio codec 280, or detect a user's touch from a specific point in map data displayed on the display module 260.

Figure 7A:
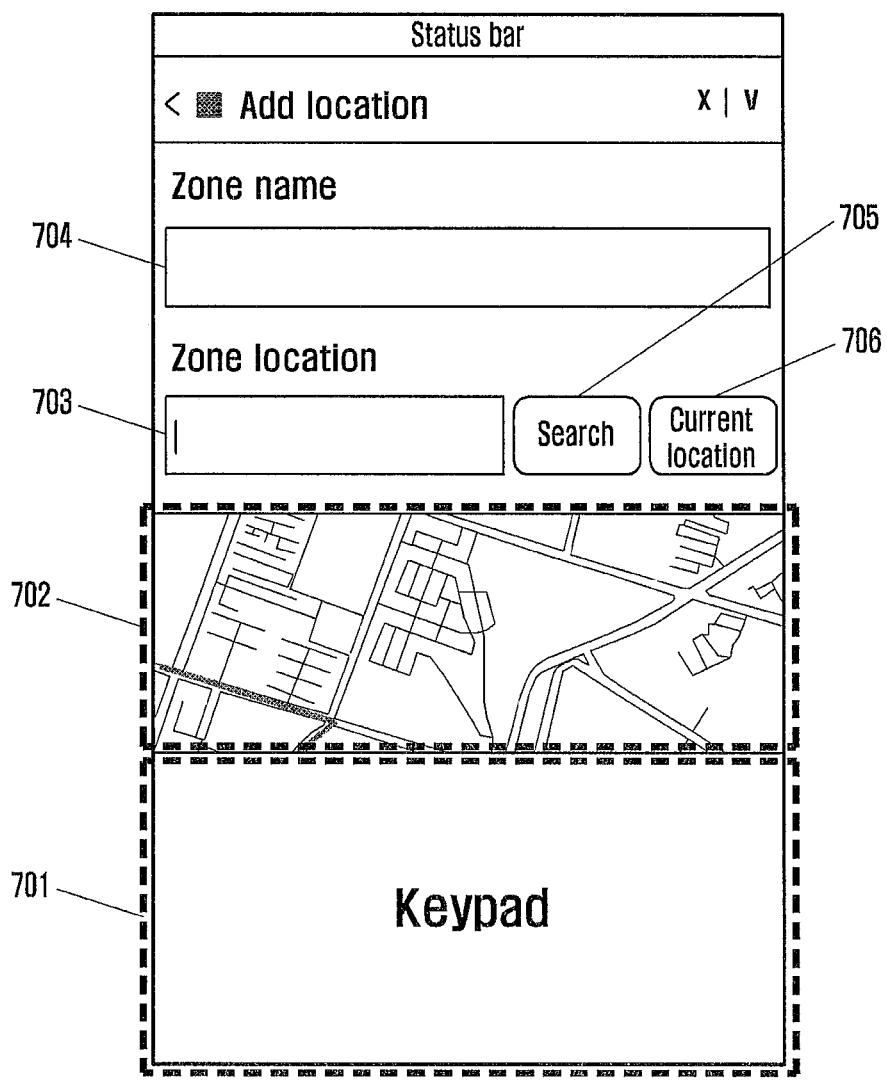
FIGS. 7A to 7C illustrate screenshots of a user interface displayed on a display module when a POI is registered according to embodiments of the present disclosure.
Figure 7B:
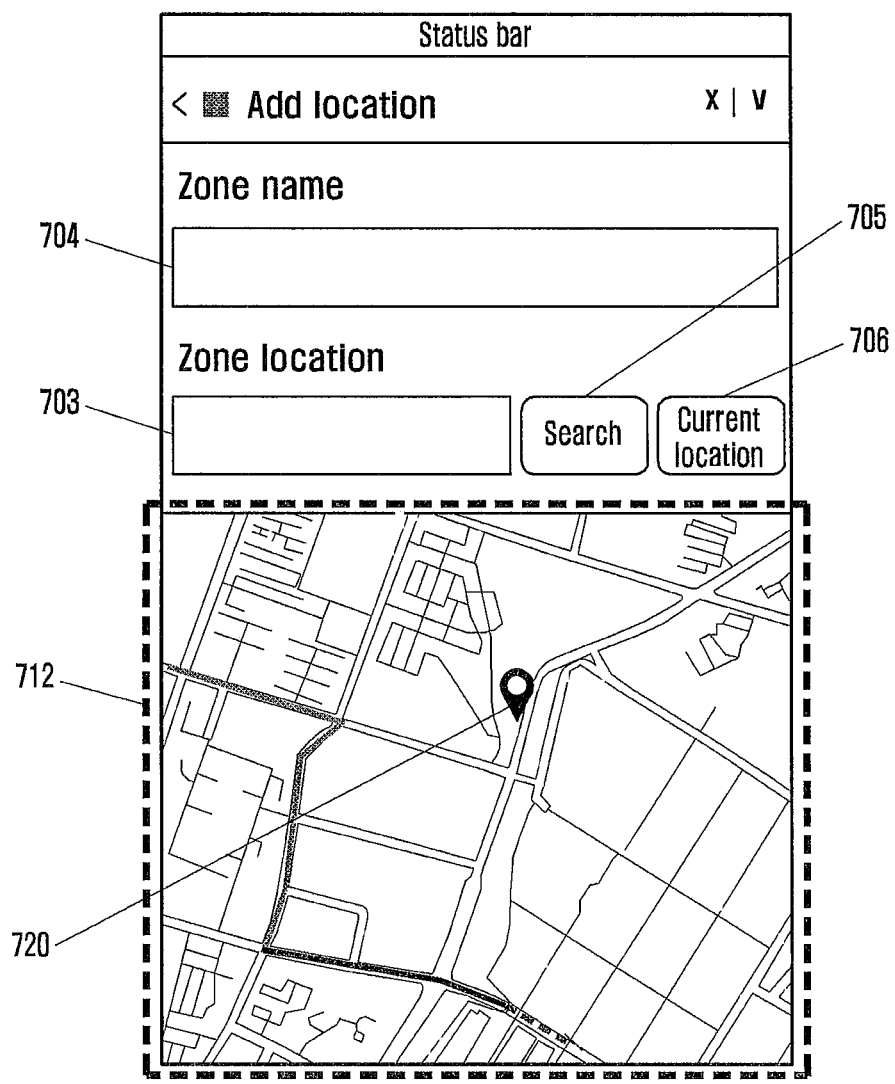
Figure 7C:
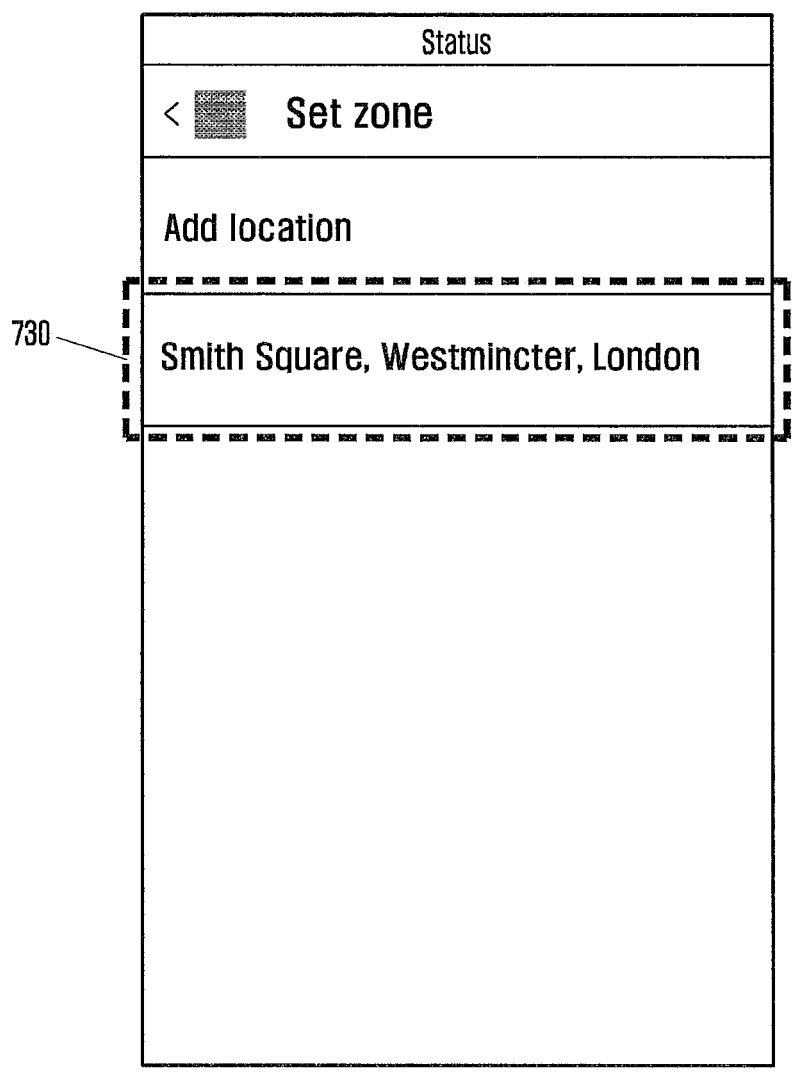

Specifically, FIGS. 7A to 7C show these examples according to embodiments of the present disclosure. FIGS. 7A to 7C illustrate screenshots of user interfaces displayed on a display module when a POI is registered according to embodiments of the present disclosure.

Referring to FIG. 7A, the display module 260 can display thereon a page for registering a desired location. This page can contain a keypad region 701 for typing an address, a map region 702 for showing a place where the electronic device is currently located or the lastly measured place where the electronic device has been located, a zone location region 703 for displaying an address entered by a user through the keypad region 701 or other special keys, a search button 705 used for requesting a search for an address entered in the zone location region 703, a current location button 706 used for requesting an automatic search for a current location, and a zone name region 704 for displaying a name of a selected place.

Like an office, a customer, a home, a favorite café, a bookstore, or a health club, it is desirable that names entered and displayed in the zone name region 704 are easily comprehensible to users.

The zone location region 703 can display an address when a user enters a certain address through the keypad region 701 or touches a specific point on the map region 702. For an address input, any separate input device can be used.

After a desired address is successfully entered, a user can select the search button 705 to find a corresponding location from the map region 702. Alternatively, without entering an address in the zone location region 703, a user can select the current location button 706 to allow the electronic device to find a current location thereof. Then such a found location can be indicated on the map region 702 or an extended map region. The latter case is shown in FIG. 7B.

FIG. 7B shows an extended map 712. On the extended map 712, the location corresponding to the entered or searched address can be represented as a certain coordinate symbol 720. In case the current location button 706 is selected, an address of the current location can be displayed in the zone location region 703.

Any location information obtained through the above process can be saved together with a zone name. FIG. 7C shows that an obtained address is displayed in an address display region 730 in the form of text.

According to an embodiment, POI data can be stored together with a specific action to be performed in connection with POI data. This action can be based on specific information as well as a specific location. For example, "business meeting" or "call appointment" can be specific information to be informed to a user. Table 2 shows some examples of POIs, specific matching information, and predefined actions to be performed together.

TABLE 2

| POI Code | Matching Information | Action |
|---|---|---|
| 001 | Meeting<br>Call Appointment<br>(Date/Time)<br>... | Alarm (Sound/Vibration) |
| 002 | Date/Time Section<br>External Information<br>Reception<br>... | Coupon Download |
| 003 | In case of Entry | Security Mode (Camera/USB Disabled) |
| 004 | In case of Entry | Heart Rate Check Mode |
| ... | ... | ... |

Referring to Table 2, a particular action to be performed can be predefined in connection with a specific POI and matching information. In case of the POI code 001 for example, an action can be assigned such that an alarm will be generated when any meeting or call appointment having matching information such as date and time is detected. This POI can be an office, a school, or the like.

In case of the POI code 002, an action can be assigned such that a coupon will be downloaded from a specific web site or server when any data and time section corresponds to the POI code. This POI can be a restaurant, a bookstore, a theater, or the like.

In case of the POI code 003, an action can be assigned absolutely when the entry is made. This POI can be a security area such as an office or a specific spot requiring the maintenance of security in the office.

In case of the POI code 004, an action can be assigned to check a heart rate after ten minutes from the entry. This POI can be a health club, a golf course, a swimming pool, a stadium, a predetermined mountain, or the like.

As discussed using Table 2, a matching relation can be predefined among a POI code, matching information, and a specific action. Matching information can be, however, stored in the electronic device or the server in the form of allowing a pre-estimation. In this case, a matching relation can be established only between a POI code and a specific action. Also, in another case, a matching relation can be defined using much more detailed information than shown in Table 2.

All types of data associated with registered POIs can be stored in the memory 220 of the electronic device 60. Alternatively, some types of data associated with POIs can be stored in the memory 220, and the others can be stored in the POI management server 50 through the network 40.

Returning to FIG. 6, if there is no request for a direct registration at step 602, the processor 210 determines at step 606 whether a popup is needed. If there is a need of popup, the processor 210 displays a popup window for registration of POI on the display module 260 and performs a POI registration process at step 608. If there is no need of popup, the processor 210 performs step 610.

Now, steps 606 and 608 will be described in more detail as follows. Step 606 of determining whether a popup is needed can be performed at the electronic device 60 or the POI management server 50. Both cases can use the same conditions. For example, a popup can be needed to inquire of a user whether to register POI in case a predefined condition is satisfied such as a lengthy stay more than a given time (e.g., two hours) at the same place and a given repetition or duration of this stay for a given period of time (e.g., three times or more for one week or twenty hours or more for one month). Such a predefined condition can be differently applied to respective individual users and changed through a separate registration. This condition can be basically set as a default value in the electronic device 60. Alternatively, in case the electronic device is registered in the POI management server 50, this condition can be set by a user or defined as a default value. Therefore, if such a predefined condition is satisfied, the processor 210 can display a popup window for registering POI on the display module 260.

The popup window displayed on the display module 260 contains any inquiry about whether to register POI. If a user selects a yes, the processor 210 can perform a POI registration process through the user input module 250 as earlier discussed with reference to FIGS. 7A to 7C. In case any popup is displayed, the step of entering an address can be skipped from the POI registration process since a current location of the electronic device 60 is a target of POI registration. In contrast, if a user selects a no when the popup window is displayed on the display module 260, the processor 210 can terminate step 608 and return to step 600.

If it is determined at step 606 that no popup is needed, the processor 210 determines at step 610 whether a report of location is needed. If there is a need of such a report, the processor 210 performs a location report process at step 612. If there is no need of a report, the processor 210 proceeds to step 614.

Normally a report of location is required in case there is the POI management server 50. In some embodiments, this location report can be performed on at least one of the following conditions: (1) in case of a lengthy stay at the same or specific place more than a given time; (2) in case the electronic device transmits location information thereof in a given time cycle; and/or (3) in case of a combination of (1) and (2).

In addition to the above three cases, if necessary, location information can transmitted to the POI management server 50 in various cases. Now, the above cases will be described in more detail.

In case of a lengthy stay at the same or specific place more than a given time, the processor 210 can determine whether the electronic device stays at a specific place for a given time (e.g., one hour or more). In this case, to determine whether any stay occurs at a certain place, the processor 210 can use the communication module 230. For example, if it is determined as the result of a periodic or continuous check that any received base station identification remains unchanged for a given time, this indicates that the electronic device stays at the same place. In another example, if any information obtained periodically or continuously from the GPS 237 shows the presence within a limited range (e.g., within a 10-meter radius) for a given time (e.g., for one hour), this indicates that the electronic device stays at the same place. In still another example, if any information obtained periodically or continuously from the Wi-Fi 233 shows the presence within a limited range for a given time, this indicates that the electronic device stays at the same place.

In case of transmission of location information, the processor 210 can send its location information to the POI management server 50 in a given time cycle (e.g., in ten minutes).

Meanwhile, at step 612, the processor 210 can offer location information which obtained through the communication module 230, to the POI management server 50 via the network 40. Alternatively, location information can be obtained from the GPS 237, the Wi-Fi 233, or the RF module 234.

Although FIG. 6 shows an example of offering the obtained location information to the POI management server 50, the electronic device 60 can just use such location information in case there is no POI management server. Further, in this case, the above-discussed steps 610 and 612 can be skipped.

If it is determined at step 610 that there is no need of a report, the processor 210 determines at step 614 whether a POI identifier is received from the POI management server 50. Such a POI identifier can be an identifier as previously discussed in Tables 1 and 2. In case the POI management server 50 transmits a POI identifier, any matching information as shown in Table 2 can be sent together with the POI identifier. Alternatively, the POI management server 50 can transmit only a POI identifier in response to the entry into a registered place, and the electronic device 60 can perform a particular action according to matching information stored therein.

If any POI identifier is received at step 614, the processor 210 performs step 616. In contrast, if no POI identifier is received, the processor 210 performs step 618.

At step 616, the processor 210 can perform a particular action predefined in connection with matching information as shown in Table 2. Alternatively, if the POI management server 50 has already had matching information and also offers a POI identifier just in case of being matched to matching information, the processor 210 can perform a particular action stored in connection with POI identifier information.

Although an action predefined in connection with matching information is shown in Table 2, this is exemplary only and not to be considered as a limitation. Any other action can be further defined according to a user's selection. For example, an action to play a broadcast of a specific channel or an action to trigger a specific application can be automatically performed.

If no POI identifier is received from the POI management server 50 at step 614, the processor 210 checks at step 618 whether inactivation of the POI controller 385 is required through the user input module 250. If so, the processor 210 ends the routine of FIG. 6. In contrast, if inactivation of the POI controller 385 is not required, the processor 210 returns to step 600 described earlier.

As discussed hereinbefore in FIG. 6, a user can directly register a desired POI at steps 602 and 604 and also register a desired POI through a registration popup window at steps 606 and 608. In case there is no POI management server 50, POI information and an associated action can be stored in the electronic device only at the time of POI registration.

In contrast, if there is the POI management server 50, it is possible to reduce considerable load of the electronic device. The POI management server 50 can store therein various identifiers of POI as shown in Table 1 and, if necessary, store therein POI matching information as shown in Table 2. Therefore, when information about entry into any registered POI is received from the electronic device, and if a predefined condition of matching information is satisfied, the POI management server 50 can transmit a POI identifier to the electronic device. Once such a POI identifier is received, the electronic device can perform a specific matching action.

Alternatively, the POI management server 50 can store POI identifiers only as shown in Table 1. In this case, when information about entry into any registered POI is received from the electronic device, the POI management server 50 can transmit a POI identifier to the electronic device. Then, based on matching information stored with such a POI identifier as shown in Table 2, the electronic device can determine whether a predefined condition of matching information is satisfied, and perform a specific matching action if the condition of matching information is satisfied. Now, a signal flow and control operation between the POI management server 50 and the electronic device will be described with reference to FIG. 8.

Figure 8:
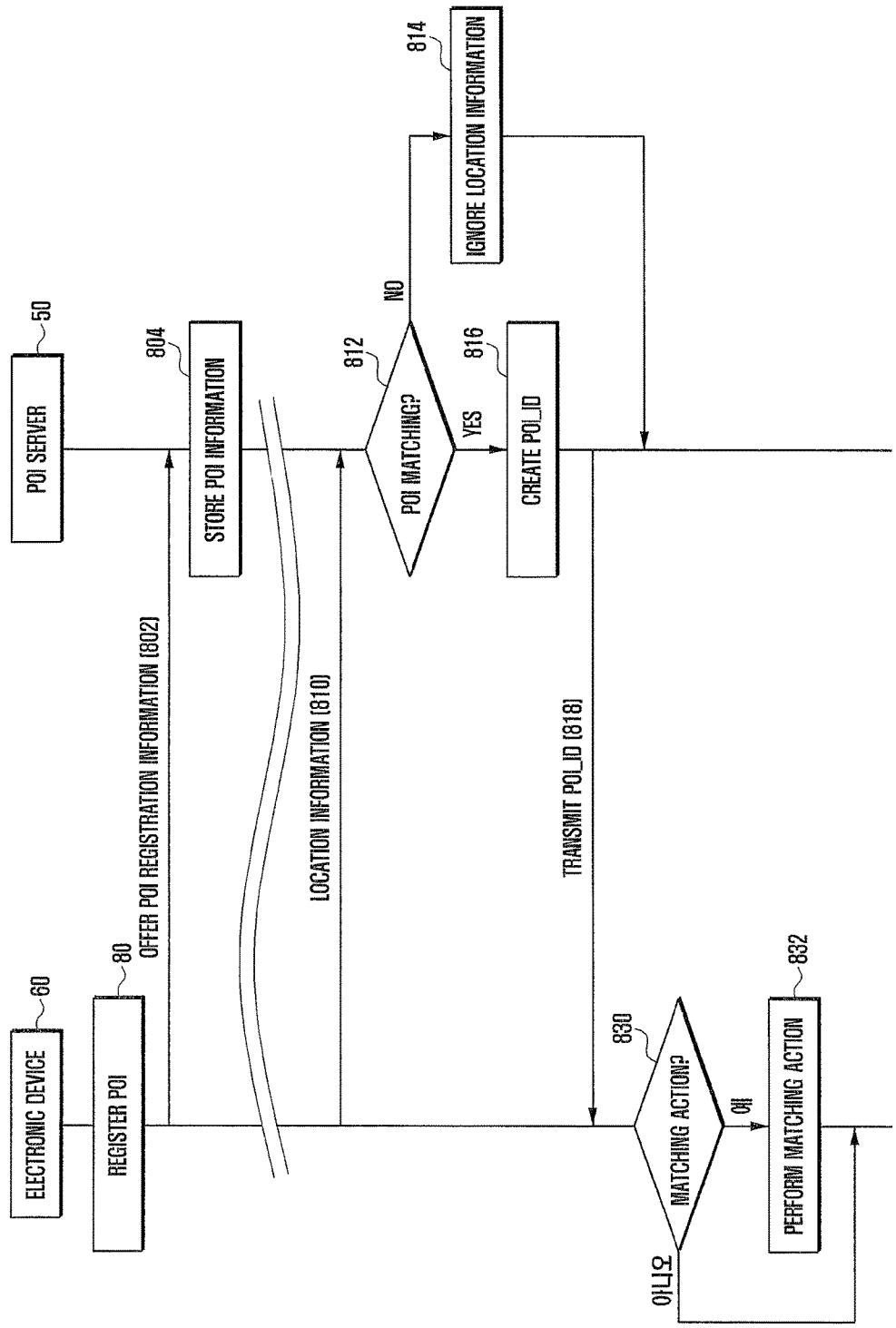
FIG. 8 illustrates a signal flow between an electronic device and a POI management server according to an embodiment of the present disclosure.

FIG. 8 is a flow diagram illustrating a signal flow between an electronic device and a POI management server according to an embodiment of the present disclosure. The electronic device 60 can register a selected POI through a registration process as previously described in FIG. 6. Namely, POI registration can be made by the electronic device 60 only or through an interaction between the electronic device 60 and the POI management server 50. The flow chart shown in FIG. 8 corresponds to the latter case.

At step 800, the electronic device 60 registers a selected POI. As shown in FIG. 6, POI registration can be performed using a popup window or directly by a user. After registration being done, at step 802 the electronic device 60 transmits POI registration information, e.g., all or part of information shown in Tables 1 and 2, to the POI management server 50. Then, at step 804, the POI management server 50 matches the received POI registration information with information about the electronic device 60 and stores it in the POI database 520 thereof.

Since the POI management server 50 stores and manages at least part of POI data, the electronic device 60 can store just part of information shown in Table 2 in the memory 220 thereof. Such POI registration can be continuously added or updated.

Thereafter, when a predetermined condition is satisfied, the electronic device 50 can transmit location information to the POI management server 50 through the network 40 at step 810. This predetermined condition can be at least one of the following: (1) a predetermined time cycle (e.g., five minutes, ten minutes, thirty minutes, etc.); (2) when location information is changed (e.g., a change in base station identification); and/or (3) in case of a lengthy stay more than a given time without any change in location (e.g., in case there is no change in base station identification for one hour or more, in case a change in location information obtained from GPS for one hour is within a given range, or in case there is no change in location information obtained from Wi-Fi for one hour or two hours).

When location information is received from the electronic device 60 at step 810, the POI management server 50 checks at step 812 whether the received location information is matched to any registered POI. Also, in case there is matching information of Table 2, the POI management server 50 can further check whether the location information is matched to any matching information shown in Table 2.

If the received location information is not matched to any registered POI at step 812, the POI management server 50 ignores the received location information at step 814.

In contrast, if the received location information is matched to any registered POI at step 812, the POI management server 50 creates a POI identifier at step 816 and then transmits the created POI identifier to the electronic device 60 at step 818. The POI management server 50 can create the same POI identifier regardless of having information of Table 1 only or having information of Tables 1 and 2.

When any POI identifier is received from the POI management server 50 at step 818, the electronic device 60 checks at step 830 whether there is any matching action. This step 830 is performed considering that the POI management server 50 can have information of Table 1 only or have information of Tables 1 and 2. If there is any matching action at step 830, the electronic device 60 performs a specific matching action at step 832. In contrast, if there is no matching action, or if a condition of Table 2 is not satisfied, the received POI identifier can be ignored.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a location based service for an electronic device, the method comprising:
   storing, at the electronic device, a plurality of actions corresponding to a plurality of locations of point of interests (POIs);
   acquiring, at the electronic device, location information of the electronic device;
   automatically transmitting, at the electronic device, the acquired location information to a point-of-interest (POI) management server when an acquired location is maintained for a predetermined time;
   receiving, at the electronic device, POI identifications information from the POI management server;
   identifying, at the electronic device, whether an action matched with POI identification information exists;
   identifying, at the electronic device, whether a predetermined condition is satisfied, when the action exists; and automatically performing, at the electronic device, the action when the predetermined condition is satisfied,
wherein the predetermined condition includes at least one of a date, a time section, an external information reception, and whether the electronic device enters a location of POI.

2. The method of claim 1, wherein the POIs including sports facilities.

3. The method of claim 1, wherein the acquired location information is obtained from a GPS (Global Positioning System), or an access point.

4. The method of claim 1, wherein each POI includes identifier information.

5. The method of claim 4, wherein the identifier information includes one of an identifier of a base station, a radius obtained from a GPS, or an identifier of an access point.

6. The method of claim 4, wherein the POI identification information includes mapping information for triggering a specific action of the electronic device.

7. The method of claim 1, wherein the acquired location information includes one of an identifier of a base station, a radius obtained from a GPS, or an identifier of an access point.

8. The method of claim 1, wherein the corresponding action is activating security mode when the acquired location information matches a predetermined office area.

9. The method of claim 1, wherein the corresponding action is activating an alarm when the acquired location information matches a location indicated on a scheduled appointment.

10. The method of claim 9, wherein each POI includes each of a POIs address entered by a user, an identifier of a base station, a radius obtained from a GPS, or an identifier of an access point.

11. An electronic device capable of providing a location based service, the electronic device comprising:
a communication module configured to acquire location information and to communicate with a point-of-interest (POI) management server that stores a plurality of locations of point of interests (POIs);
a memory configured to store a plurality of actions corresponding to the locations of POIs; and
a processor configured to:
automatically transmit the acquired location information to the POI management server through the communication module when an acquired location is maintained for a predetermined time,
receive POI identification information from the POI management server,
identify whether an action matched with POI identification information exists,
identify whether a predetermined condition is satisfied, when the action exists, and
automatically perform the action among the plurality of actions when the predetermined condition is satisfied,
wherein the predetermined condition includes at least one of a date, a time section, an external information reception, and whether the electronic device enters a location of POI.

12. The electronic device of claim 11, wherein the POIs including sports facilities.

13. The electronic device of claim 11, wherein the acquired location information is obtained from a Global Positioning System (GPS), or from an access point.

14. The electronic device of claim 11, wherein each POI includes identifier information.

15. The electronic device of claim 14, wherein the identifier information includes one of an identifier of a base station, a radius obtained from a GPS, or an identifier of an access point.

16. The electronic device of claim 14, wherein the POI identification information includes mapping information for triggering a specific action of the electronic device.

17. The electronic device of claim 11, wherein the acquired location information includes one of an identifier of a base station, a radius obtained from a GPS, or an identifier of an access point.

18. The electronic device of claim 11, wherein the corresponding action is activating security mode when the acquired location information matches a predetermined office area.

19. The electronic device of claim 11, wherein the corresponding action is activating an alarm when the acquired location information matches a location indicated on a scheduled appointment.

20. The electronic device of claim 19, wherein each POI includes one of a POI address entered by a user, an identifier of a base station, a radius obtained from a GPS, or an identifier of an access point.

* * * * *